United States Patent
Hamid et al.

(10) Patent No.: US 9,922,265 B2
(45) Date of Patent: Mar. 20, 2018

(54) GLOBAL-SCALE OBJECT DETECTION USING SATELLITE IMAGERY

(71) Applicant: DigitalGlobe, Inc., Longmont, CO (US)

(72) Inventors: Muhammad Hamid, Thornton, CO (US); Stephen O'Hara, Thornton, CO (US)

(73) Assignee: DigitalGlobe, Inc., Longmont, CO (US)

(*) Notice: Subject to any disclaimer, the term of this patent is extended or adjusted under 35 U.S.C. 154(b) by 131 days.

(21) Appl. No.: 14/810,382

(22) Filed: Jul. 27, 2015

(65) Prior Publication Data

US 2016/0026848 A1 Jan. 28, 2016

Related U.S. Application Data

(60) Provisional application No. 62/029,337, filed on Jul. 25, 2014.

(51) Int. Cl.
*G06K 9/00* (2006.01)
*G06K 9/46* (2006.01)

(52) U.S. Cl.
CPC ....... *G06K 9/4671* (2013.01); *G06K 9/00637* (2013.01)

(58) Field of Classification Search
CPC ............ G06K 9/00637; G06K 9/4671; G06K 9/0063; G06K 9/2081; G06K 9/4676; G06K 9/481; G06K 9/525; G06K 9/6218; G06K 9/6269
See application file for complete search history.

(56) References Cited

U.S. PATENT DOCUMENTS

| | | | | |
|---|---|---|---|---|
| 2007/0116365 A1* | 5/2007 | Kloer | ............... | G06K 9/6228 382/190 |
| 2012/0143856 A1* | 6/2012 | Klinkigt | ............... | G06K 9/4671 707/723 |

OTHER PUBLICATIONS

Jonathan S. Hare; Sina Samangooei; and Paul Lewis, "Efficient Clustering and Quantisation of SIFT features: Exploiting Characteristics of the SIFT descriptor and Interest Region Detectors Under Image Conversion", Apr. 17-20, 2011, ACM 978-14503-0336—Jan. 11, 2004.*

Anne-Lise Chesnel, Renaud Binet; and Lucien Wald, "Object Assessment of Damage Due to Natural Disaster Using Very High Resolution Images", Jul. 2007, IEEE International Geoscience & Remote Sensing Symposium, pp. 3736-3739.*

* cited by examiner

*Primary Examiner* — Siamak Harandi
(74) *Attorney, Agent, or Firm* — Galvin Patent Law LLC; Brian R. Galvin

(57) ABSTRACT

A system for performing global scale object detection using satellite imagery, comprising an object detection server that receives and analyzes image data to identify objects within an image via a curated computational method, and a curation interface that enables a user to curate image information for use in object identification, and a method for a curated computational method for performing global scale object detection.

3 Claims, 13 Drawing Sheets

GLOBAL-SCALE OBJECT DETECTION USING SATELLITE IMAGERY

CROSS-REFERENCE TO RELATED APPLICATIONS

The present application claims the benefit of, and priority to, U.S. provision patent application Ser. No. 62/029,337, titled "GLOBAL-SCALE OBJECT DETECTION USING SATELLITE IMAGERY" and filed on Jul. 25, 2014, the entire specification of which is incorporated herein by reference in its entirety.

BACKGROUND OF THE INVENTION

Field of the Art

The disclosure relates to the field of image processing, and more particularly to the field of automated object detection using satellite imagery.

Discussion of the State of the Art

In recent years, there has been a substantial increase in the availability of high-resolution commercial satellite imagery, enabling a variety of new remote-sensing applications. One of the main challenges for these applications is the accurate and efficient extraction of semantic information from satellite imagery. An important instance of this class of challenges involves automatic detection of multiple objects in satellite images. Given the scale of the problem, one of the key challenges in learning object detectors is the acquisition and curation of labeled training data. Over the years, there has been a tremendous increase in both the amount and resolution of satellite imagery. This growth has resulted in several novel application opportunities, including everything from precision agriculture to automatic construction of three-dimensional terrain models. A key challenge shared among all these applications is the accurate and efficient extraction of semantic information from satellite imagery.

What is needed, is a means to accurately and efficiently identify and localize key objects in a region of significant geographic scale.

SUMMARY OF THE INVENTION

Accordingly, the inventor has conceived and reduced to practice, in a preferred embodiment of the invention, various methods for global scale object detection using satellite imagery.

According to a preferred embodiment of the invention, a system for performing global scale object detection using satellite imagery, comprising an object detection server comprising at least a plurality of programming instructions stored in a memory and operating on a processor of a network-connected computing device and configured to receive at least a plurality of image information from an image database, and configured to analyze at least a portion of the image information, and configured to produce at least a plurality of object vector representations based at least in part on at least a portion of the analysis results; and a curation interface comprising at least a plurality of programming instructions stored in a memory and operating on a processor of a computing device and configured to receive at least a portion of a plurality of image information, and configured to receive interaction from a human user and to modify at least a portion of the plurality of image information based at least in part on at least a portion of the user interaction, is disclosed.

According to another preferred embodiment of the invention, a method for performing global scale object detection using satellite imagery, comprising the steps of querying, using an object detection server comprising at least a plurality of programming instructions stored in a memory and operating on a processor of a network-connected computing device and configured to receive at least a plurality of image information from an image database, and configured to analyze at least a portion of the image information, and configured to produce at least a plurality of object detection identifiers based at least in part on at least a portion of the analysis results, a database for a plurality of image information; extracting a plurality of scale-invariant transform descriptors based at least in part on at least a portion of the plurality of image information; performing k-means clustering on at least a portion of the plurality of image information; producing a plurality of locally-constrained linear codes based at least in part on at least a portion of the plurality of image information; and performing spatial pooling based at least in part on at least a portion of the plurality of locally-constrained linear codes to produce a plurality of object vector representations, the object vector representations corresponding to at least a plurality of objects identified within at least a portion of the plurality of image information, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

Figure 5:
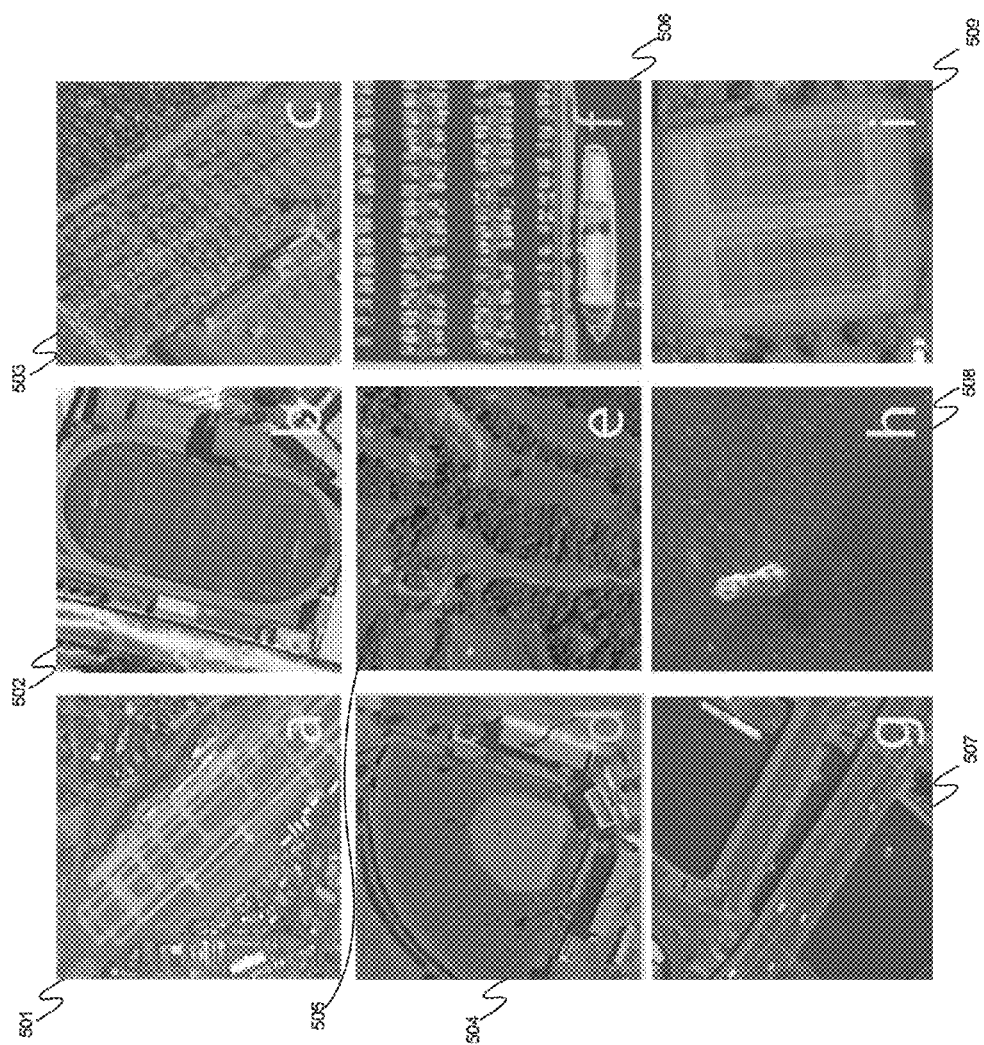

FIG. 5 provides several examples of object classes detected, according to various embodiments of the invention.

Figure 6:
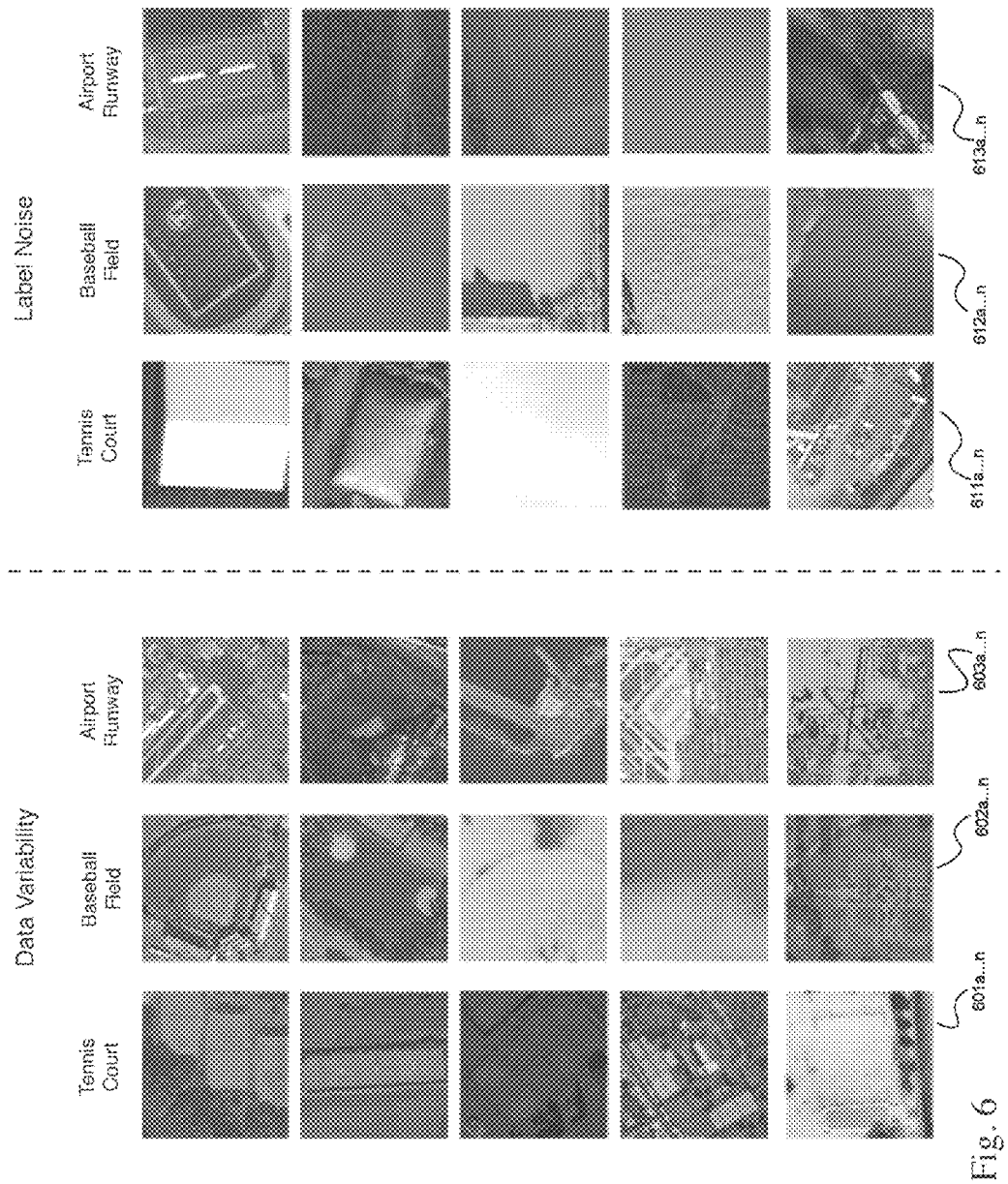

FIG. 6 is an illustration of "Open Street Map (OSM) noise" for various object classes.

Figure 7:
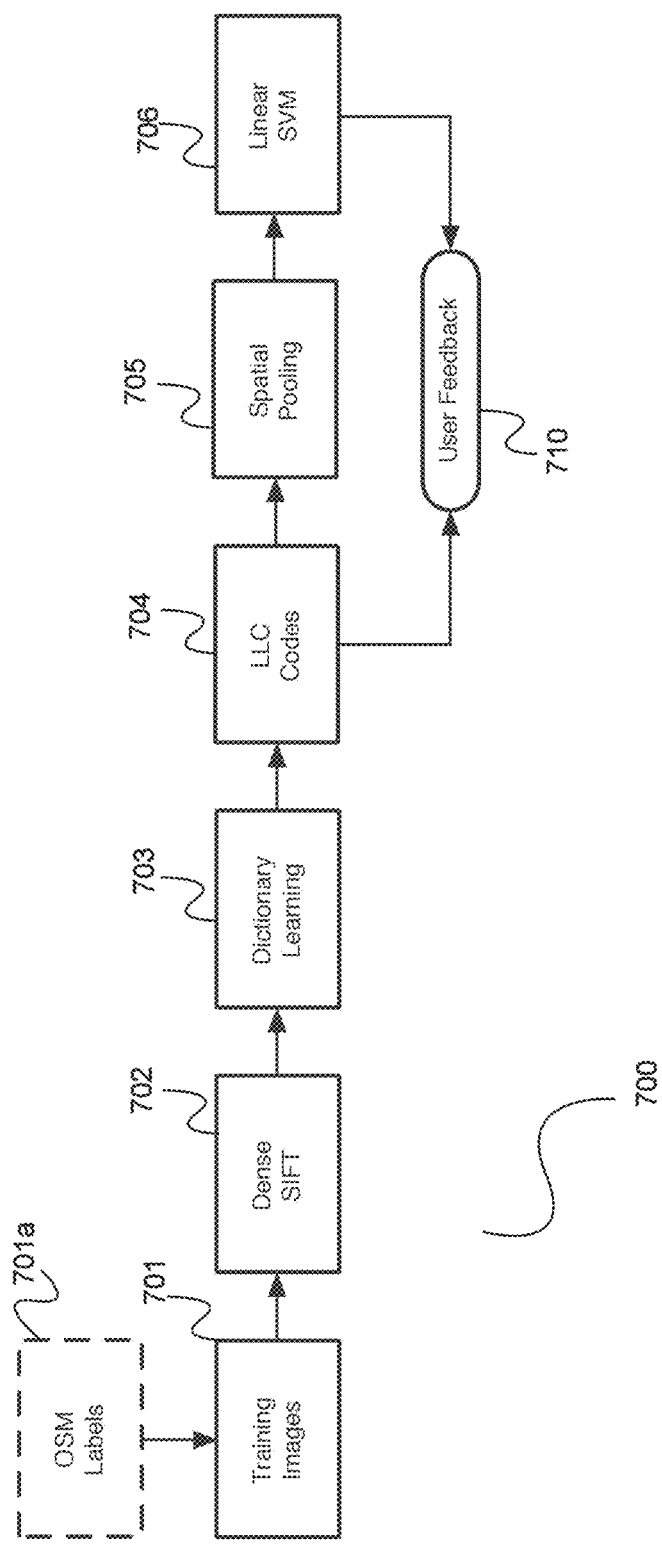

FIG. 7 is a flow diagram of an exemplary curated computational method according to a preferred embodiment of the invention.

Figure 8:
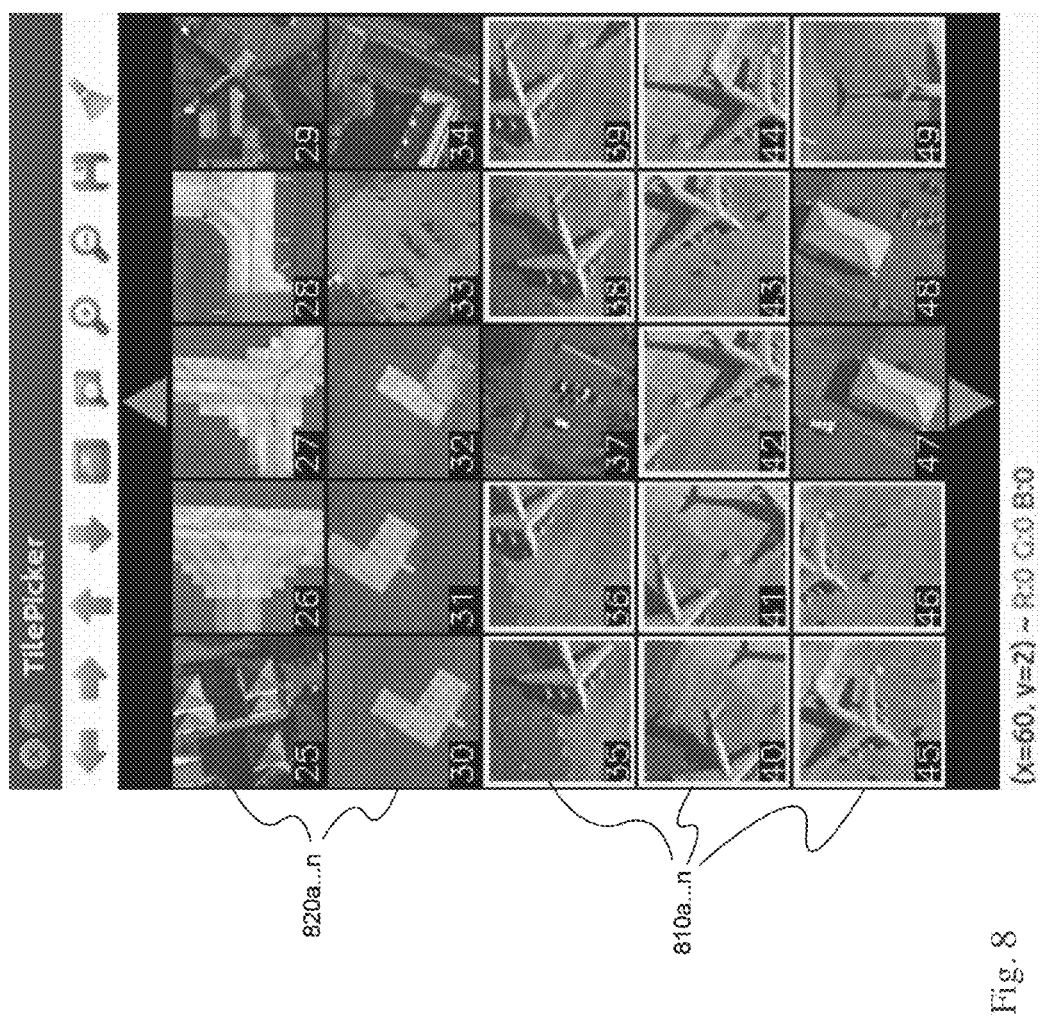

FIG. 8 is an illustration of the TilePicker GUI used to curate detections as part of the detection process, according to an embodiment of the invention.

Figure 9:
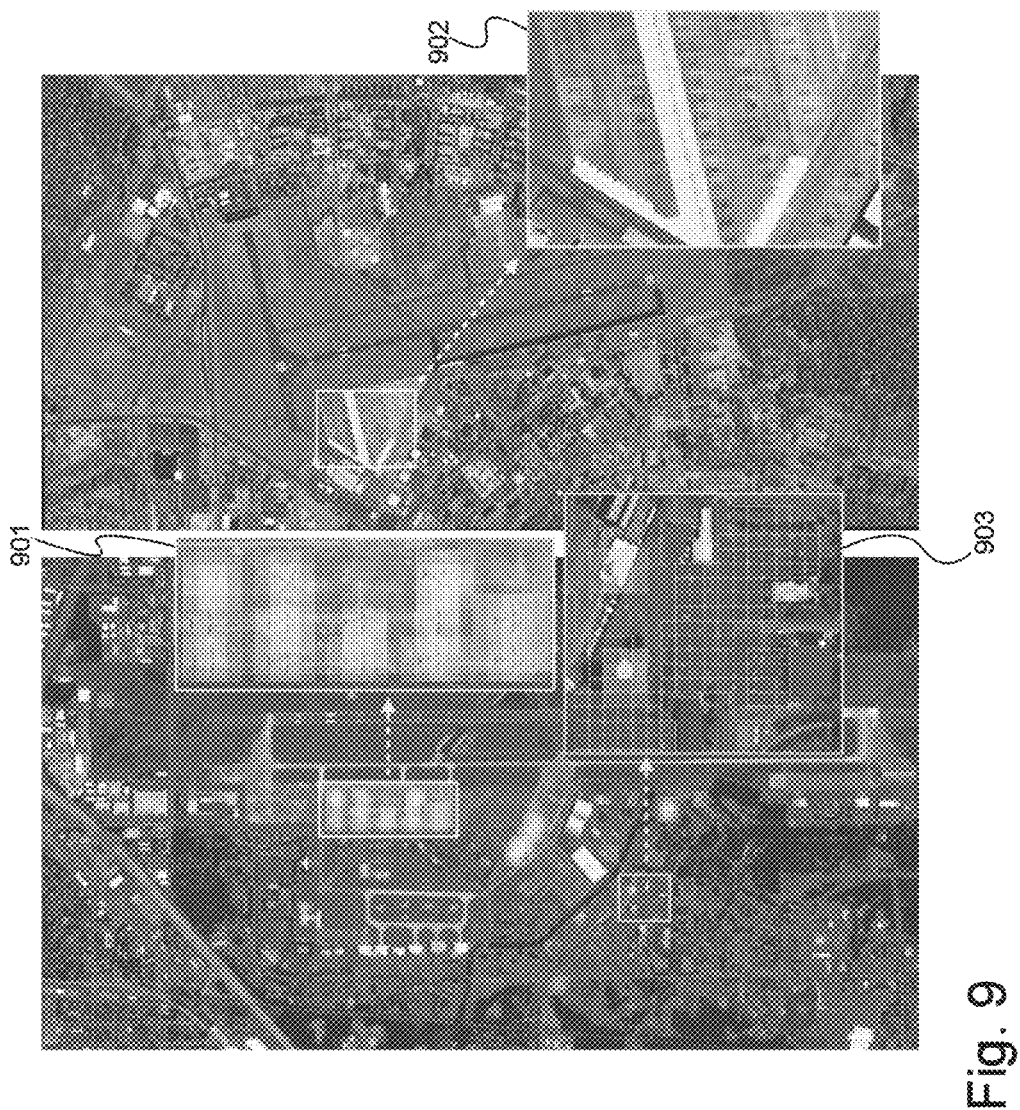

FIG. 9 shows a series of detections for McChord AFB using an embodiment of the invention.

Figure 10:
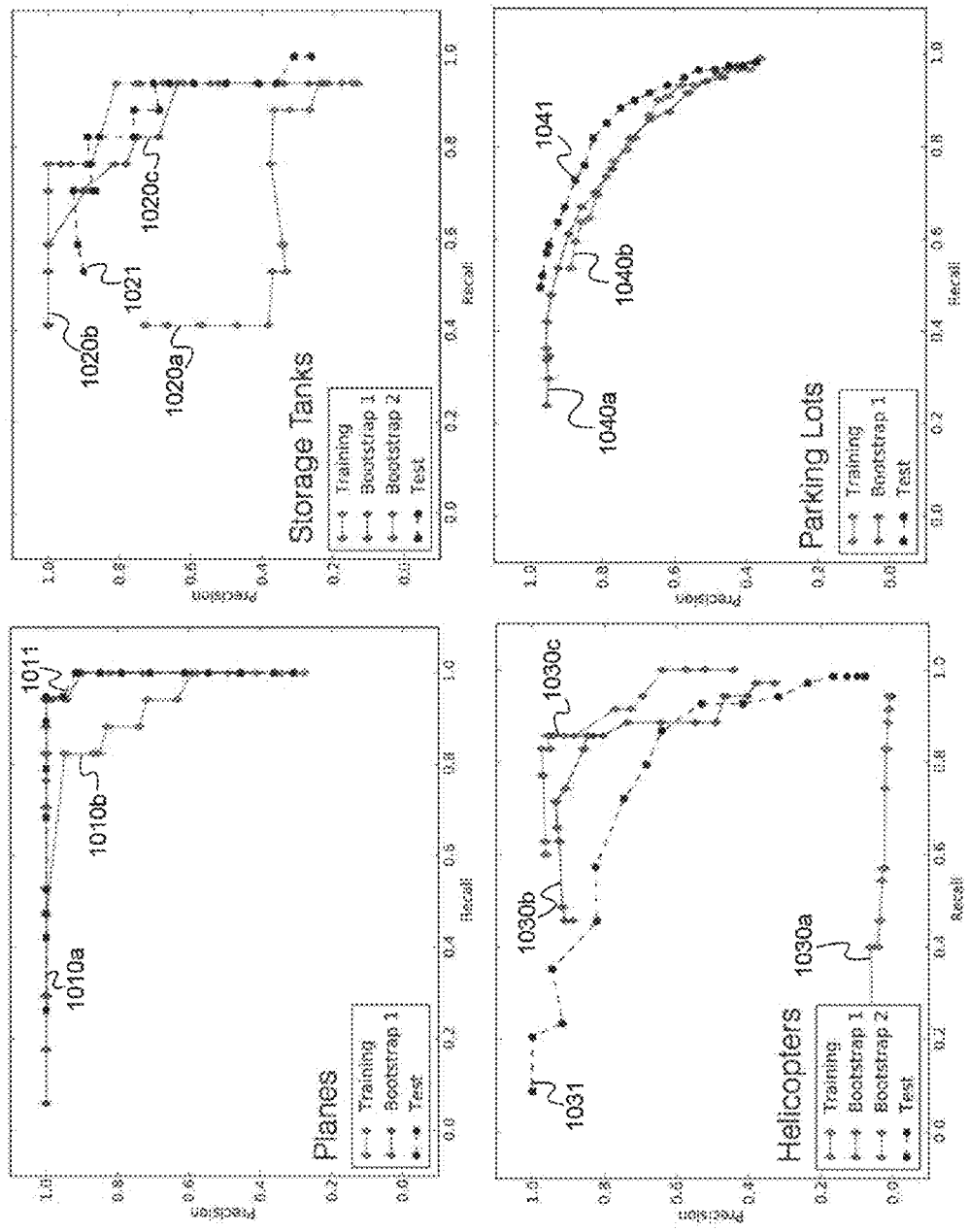

FIG. 10 shows a series of precision-recall curves for the McChord AFB data set.

Figure 11:
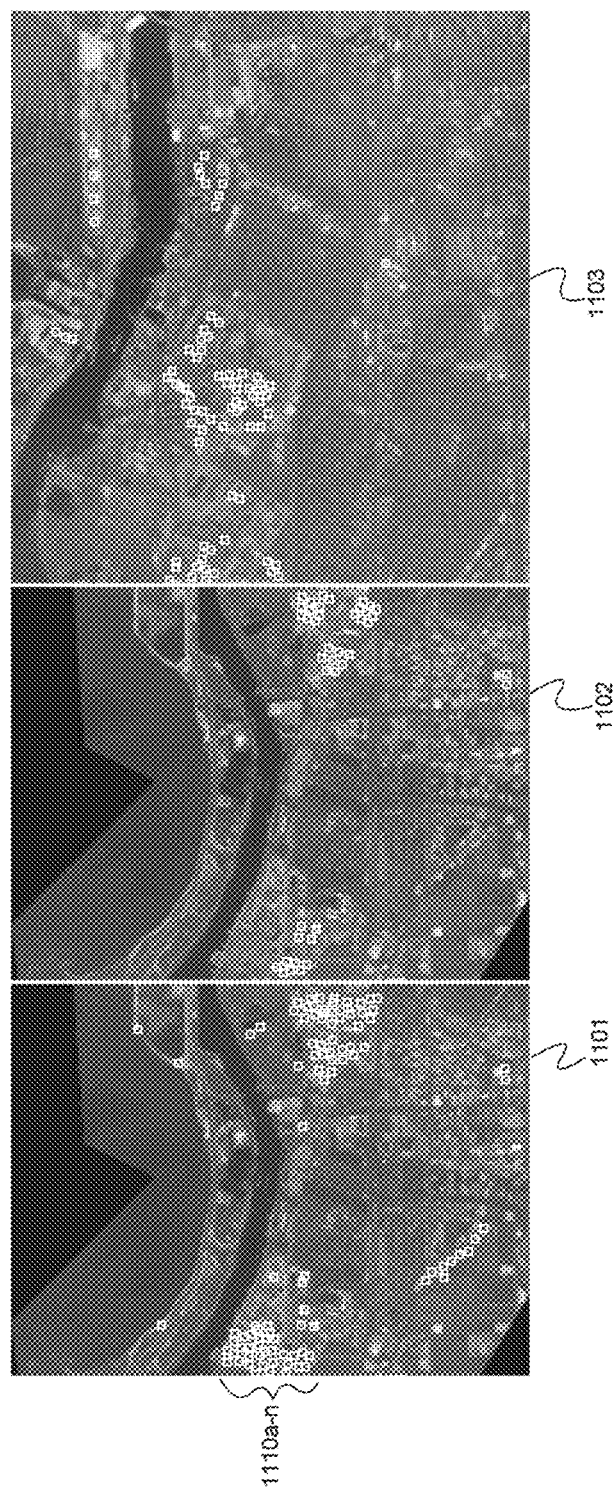

FIG. 11 shows a series of detections for Corpus Christi using an embodiment of the invention.

Figure 12:
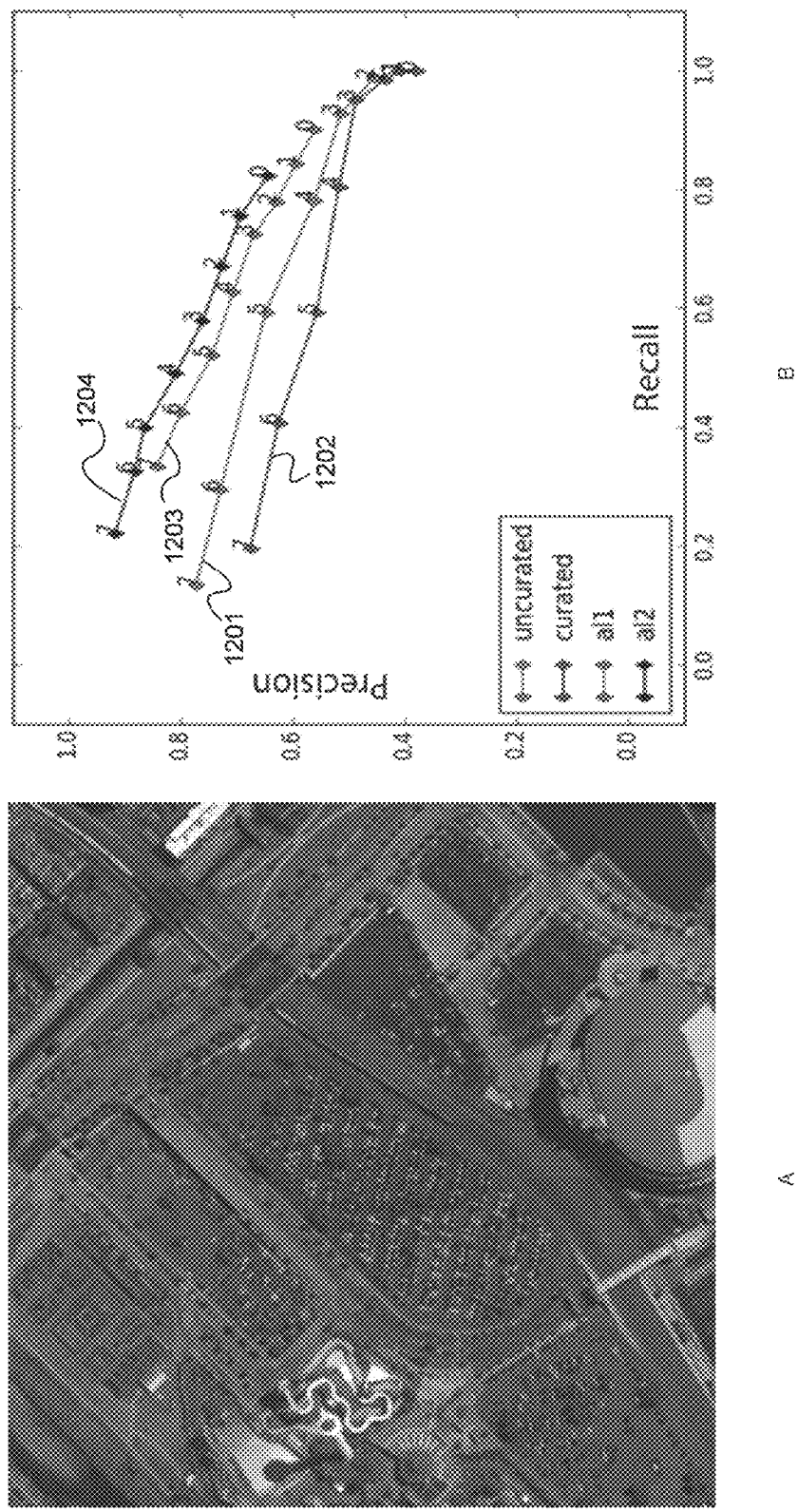

FIG. 12 shows a visualization of parking lot detection results in the Denver area, using an embodiment of the invention.

Figure 13:
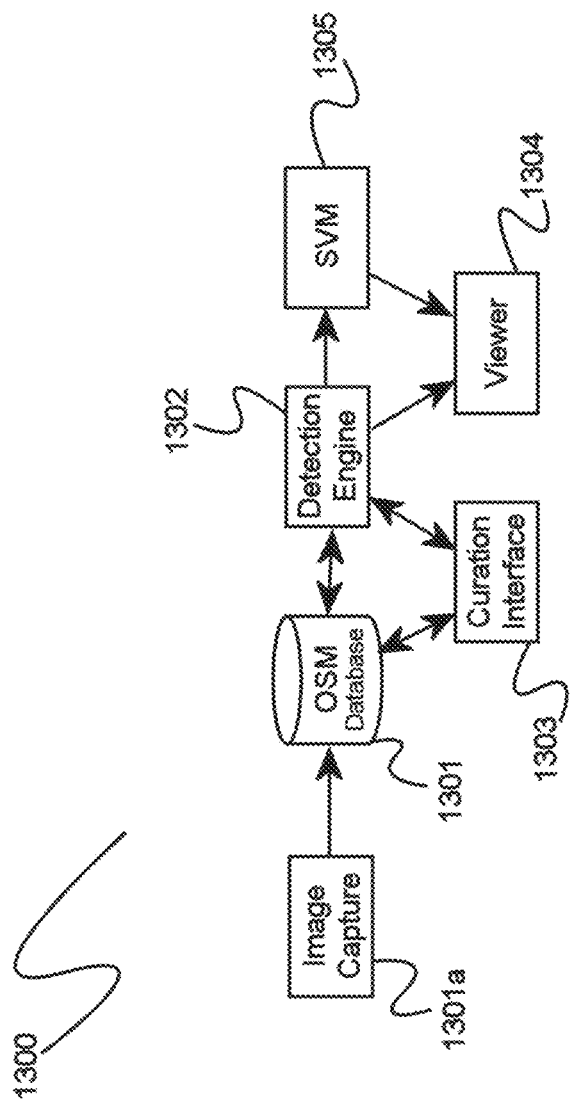

FIG. 13 is a block diagram of an exemplary system architecture for performing global scale object detection using satellite imagery, according to a preferred embodiment of the invention.

DETAILED DESCRIPTION

The inventor has conceived, and reduced to practice, various methods for global scale object detection using satellite imagery.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
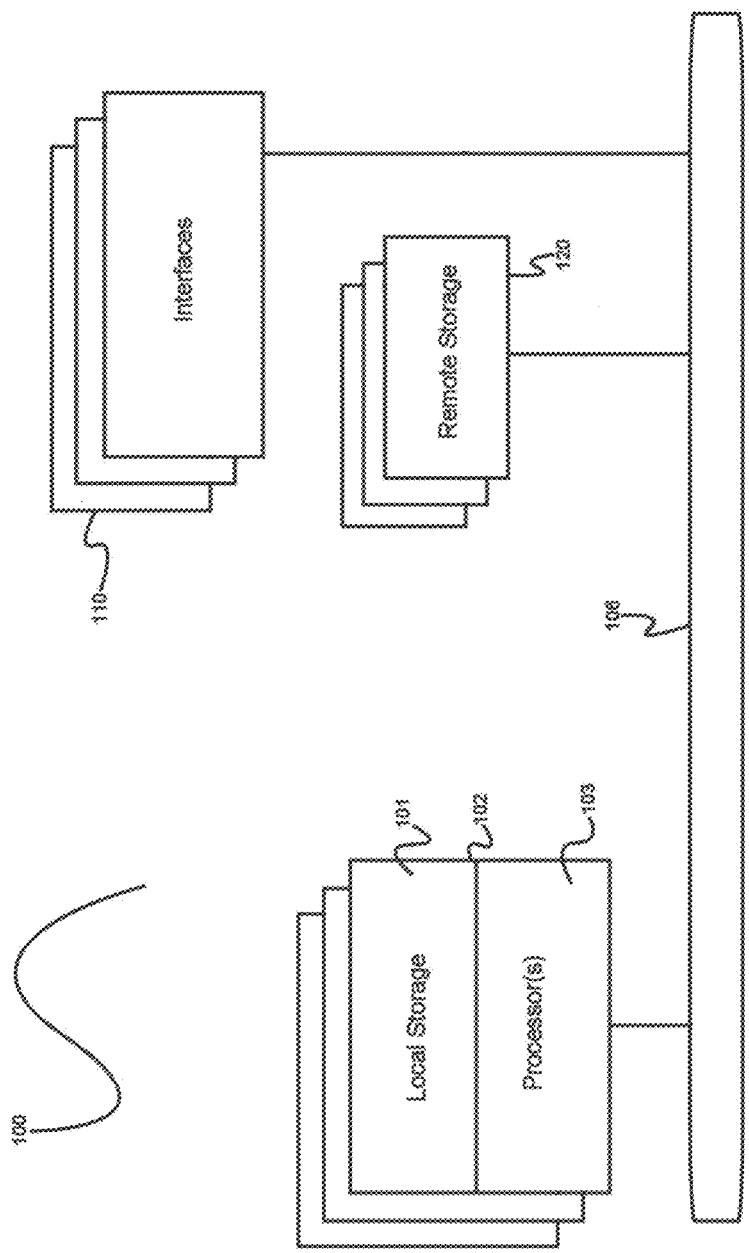
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. Additionally, it will be understood by one having ordinary skill in the art that an array of graphics processing units (GPUs) may be used instead of, or in addition to, processors of the aforementioned types.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
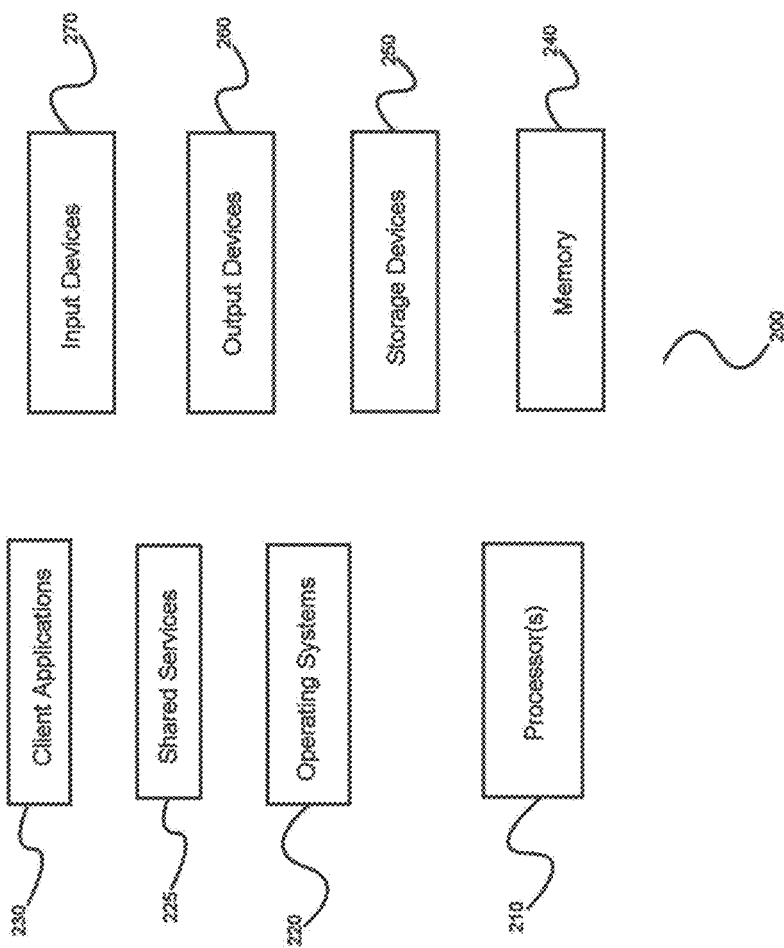
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to a system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
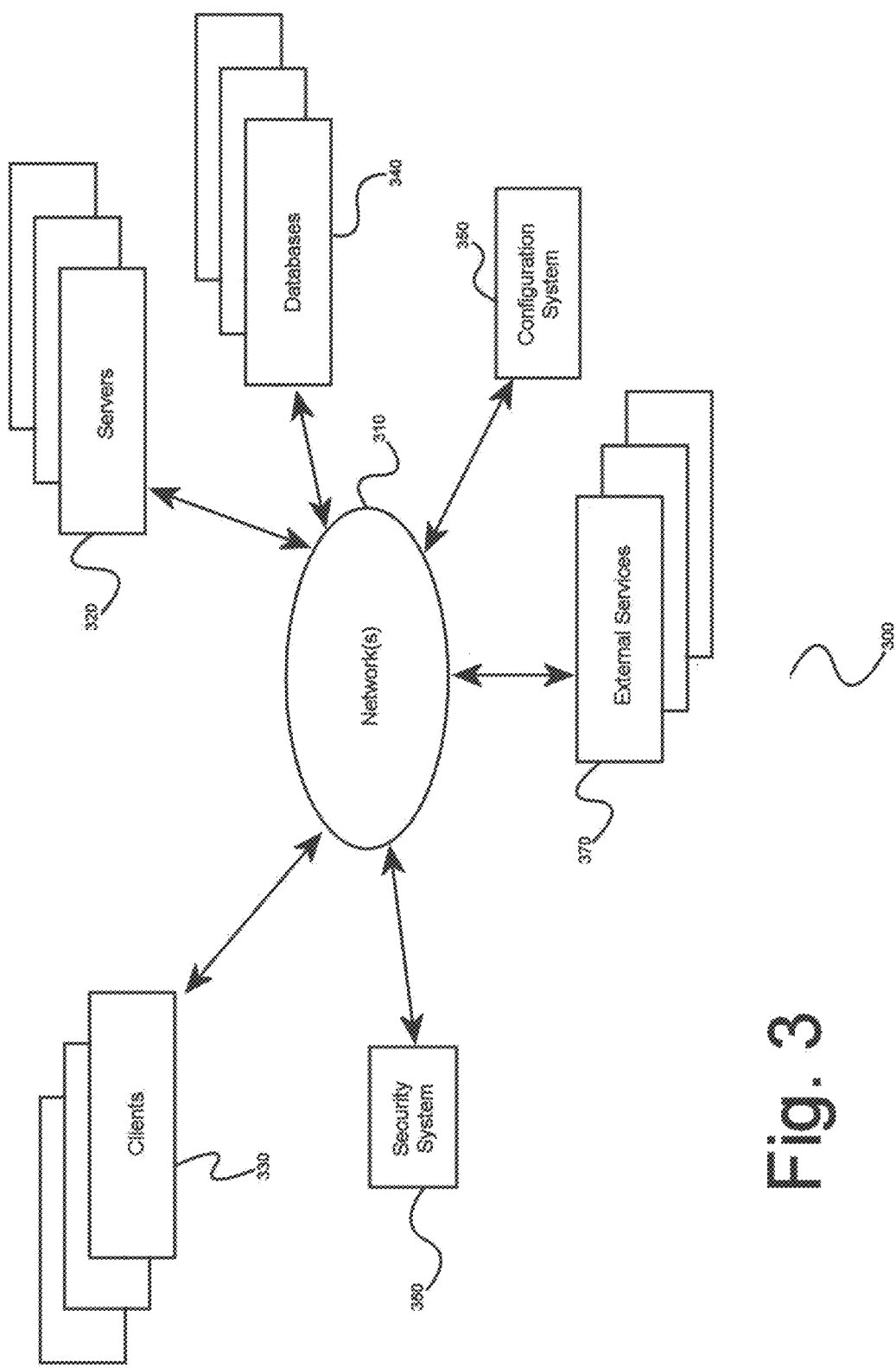
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
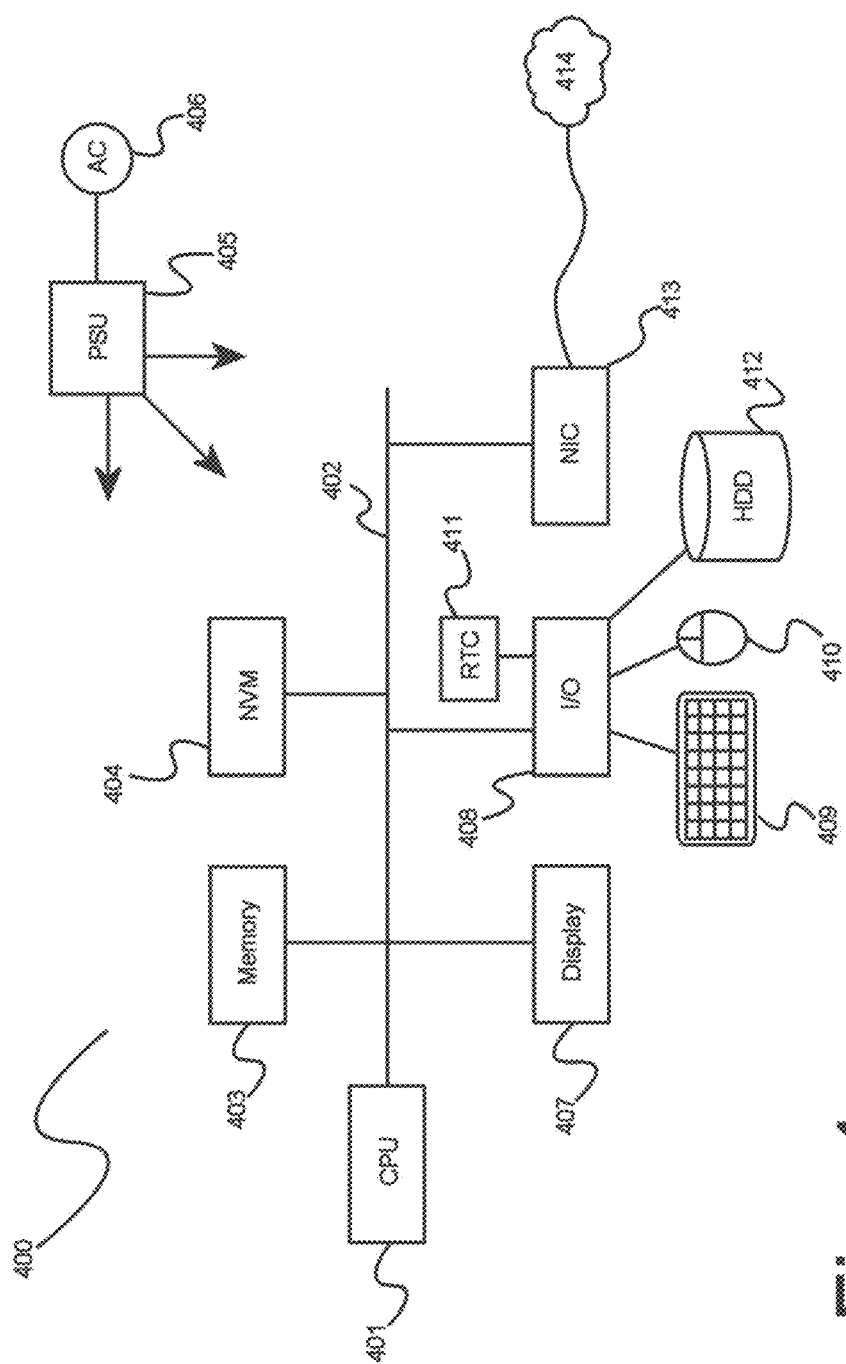
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

FIG. 13 is a block diagram of an exemplary system architecture for performing global scale object detection using satellite imagery, according to a preferred embodiment of the invention. According to the embodiment, an OpenStreetMap (OSM) database 1301 may comprise a plurality of stored image information, for example as captured by a plurality of image capture sources 1301a such as imaging satellites or other image-capture devices. OSM data may be utilized by a curation interface 1303 for manual curation by a human user, for example via a software-based graphical interface configured to allow a user to manually review or modify image data. According to the embodiment, a software detection engine 1302 may receive and operate on a plurality of OSM data to perform object detection operations as described in the embodiments and exemplary use cases herein. Image data with object detection information may then be provided to a software or hardware viewer 1304 for review by a human user (such as on a display monitor for users to visually confirm object detection results), or to an additional support vector machine 1305 that may perform additional object vector detection prior to presentation to a user via viewer 1304 (as described below, referring to FIG. 7).

Detailed Description of Exemplary Embodiments

While automatic object detection from satellite imagery has been explored in the past, the embodiments disclosed herein approach this challenge in a more detailed manner that is different from the previous efforts in several important ways. These include the scale of the problem, the number of object classes (referring to FIG. 5), the use of crowdsourcing for the acquisition and curation of labeled training data, and a focus on detection as opposed to multi-class classification. As shown in FIG. 5, a number of object classes may be available for detection, including (for example, and not limited to) airstrips 501, sports areas such as basketball 502, baseball 504, or tennis 509 playing areas, vehicle-dense areas such as parking lots 503 or marinas 506, natural formations such as parks 505, or architectural features such as bridges 507 or lighthouses 508.

Given the high variance in the chromatic appearance of objects over different geographic locations (see FIG. 6), using edge-based characteristics of objects is a natural choice for learning robust classifiers. While previous approaches have focused on using such edge-based characteristics directly in a bag-of-words framework, the embodiments disclosed herein utilize a more sophisticated feature encoding scheme before utilizing the codes in a "bag-of-features" framework. This improved coding scheme makes a framework more robust to variances in object appearance due to varying illumination, climate and terrain conditions.

For a data-driven approach according to the embodiments disclosed herein, having correctly labeled training data is critical. However, conventional data-labeling strategies simply do not scale up to requirements often faced. Therefore rely upon crowdsourcing for the acquisition and curation of the training labels. In particular, an exemplary method may start with object labels and coordinates given in an OpenStreetMap (OSM) database to train initial detectors. Then these initial detectors may be applied over different geographical locations and curate the false detections and omissions in an iterative manner. This process may be repeated once or twice to finally converge to a sufficiently accurate detector adapted to the characteristics of a particular geographic area. Note that by bootstrapping the learning process with the labels from OSM, it becomes possible to significantly reduce the amount of curation required from the crowd during detector adaptation, resulting in an efficient and scalable training framework. Also note that the labels from OSM can be noisy (see FIG. 6), and therefore may require some initial curation to reduce label noise. As shown in FIG. 6, object data and noise levels may vary. Shown are a number of exemplary data variances for a tennis court 601a-n, baseball field 602a-n, or airport runway 603a-n, highlighting the variable nature of data capture. Also shown are a variety of exemplary label noise samples, illustrating "false positives" that may produce misleading results, again showing samples where the labels for "tennis court" 611a-n, "baseball field" 612a-n, and "airport runway" 613a-n have been misapplied to incorrect data samples.

An important advancement in image representation has been the development of texture-based image descriptors. Given their tolerance to factors such as rotation and illumination changes, these descriptors have been successfully used to classify images in a "bag-of-visual-words" representation. One limitation of bag-of-visual-words models is that they discard the spatial locations of the features, relying only on the relative frequencies of the visual words in the representation. Spatial pooling has emerged as way to retain much of the important relative positional information of the feature descriptors without overly complicating the representation. These approaches have been further improved by schemes that utilize distance based soft assignments for descriptor quantization. In this work, locally linear codes (LLC) and spatial pyramids may be utilized for image encoding.

FIG. 7 is a flow diagram of an exemplary curated computational method 700 according to a preferred embodiment of the invention, the steps of which are described in detail below.

One way to mitigate the large-scale labeling needs of our problem is to rely upon crowdsourcing to obtain training data. Like several other applications, crowdsourcing may be used to generate labels in satellite imagery. However, unlike previous work in this area, here a focus may be placed on utilizing such data for the purposes of learning and refining models for automated, large-scale object detection. Given the scale of the problem at hand, un-curated training data may be generated in an initial step 701 by querying an OSM database 701a to locate objects of interest in a multipetabyte historical image archive. An initial set of object models may be learned from the OSM-derived un-curated training samples, and the results of these models may be used to bootstrap the creation of curated data. This process dramatically reduces the size of the imagery the crowd needs to observe in order to generate quality training data.

In a next step 702, operation may continue by extracting 128-dimensional scale-invariant feature transform (SIFT) descriptors at equally spaced dense grids over each of a plurality of training images from all object classes. According to the embodiment, SIFT descriptors may be employed, but a framework may be designed in a modular fashion so that other feature descriptors can easily be employed, and operation should not be considered as limited to using SIFT descriptors alone.

Using the SIFT features extracted from the training images, k-means clustering may be used in a next step 703 to discover descriptor modes in training data. Following the terminology from natural language processing (NLP) for document representation, finding these modes is equivalent to discovering a dictionary of visual words. For example, a dictionary of size 1024 may be used (but it should be appreciated that the size may be variable).

It will be appreciated by one having ordinary skill in the art that SIFT is not the only possible approach for generating feature descriptors. For example, in another embodiment a Histogram of Oriented Gradients (HOG) approach may be used, as documented in Dalal, Navneet, and Bill Triggs: "Histograms of oriented gradients for human detection", published in *Computer Vision and Pattern Recognition, 2005. CVPR 2005. IEEE Computer Society Conference on*. Vol. 1. IEEE, 2005, without departing from the scope of the invention.

While gradient-based image descriptors have shown some promise as feature representations in satellite image classification, these approaches tend to employ hard-assignment during feature quantization. In contrast, according to the embodiment in a next step 704 an encoding approach may be used that employs distance based soft-assignment during feature quantization along with locality constrained regularization. These locally constrained linear codes (LLC) ensure improved feature reconstruction by generating a space that better captures data nonlinearities. According to the embodiment, the LLC codes may use the following optimization cost-function:

$$\min_C \sum_{i=1}^{N} \|x_i - Be_i\|^2 + \lambda \|d_i \odot e_i\|^2$$

where $\odot$ represents element-wise product, $x_i \in R^D$ is the feature vector, and $B=[b_1, b_2, \bullet, \bullet, \bullet, b_M] \in R^{D \times M}$ is a basis vector codebook. Moreover, $d_i \in R^M$ is the locality adaptor that varies for each basis vector based on its similarity to $x_i$. More concretely, $$d_i = \exp\left(\frac{dist(x_i, B)}{\sigma}\right)$$

where $dist(x_i, B)=[dist(x_i, b_1), dist(x_i, b_2), \bullet, \bullet, \bullet, dist(x_i, b_M)]$, and $dist(x_i, b_j)$ is the Euclidean distance between $x_i$ and $b_j$. Furthermore, here adjusts the weight decay rate for the locality adaptor.

A means to incorporate locality constraints in image representation, spatial pooling has emerged as an important step in image classification systems. In particular, spatial pyramids have been shown to be a useful way to perform spatial pooling for a wide variety of features. In a next step 705, spatial pooling may be computed over the dense LLC codes for each of the training images to generate the final feature vector representations.

The space generated by the LLC image codes attempts to capture the nonlinearities of the data accurately, using locally-linear approximations. Spatial pooling has the effect of greatly increasing the dimensionality of the feature vector, which can be a benefit for finding separating hyperplanes as classification decision boundaries, but also increases the computational and storage requirements of the system. According to the embodiment in a final step 706, a linear support vector machine (SVM) may be utilized to solve these problems. User feedback 710 may be incorporated to improve results, for example after manual review of LLC codes or SVM operation.

Given a previously learned dictionary and a test image, SIFT features may be computed using a dense grid, and LLC codes found for each of the grid locations. Based on the object-class under consideration, the test image may be scanned using a sliding window of a specific size. For each of the sliding-windows spatial pooling may be performed, and the resulting feature vector scored using the previously-learned classifier for the particular object of interest. A final detection decision is made by applying a threshold to the score for each window.

Three exemplary data sets according to the method described previously (referring to FIG. 7) are provided: McChord Air Force Base (AFB) for detection of multiple object classes, and two secondary data sets (one in Corpus Christi, Tex., for evaluating oil storage tank detection, and another in Denver, Colo., for evaluating parking lot detection in an urban setting). Details and results for each of the three data sets are provided below.

Detection results may be improved through a bootstrapping process wherein a model may be fine-tuned for a given data set by curating the detections (and the mis-detections) to generate additional positive and negative training samples. For example, this may be done by using a set of training data to construct an initial detector. Detections may then be processed on a validation image, setting the detection threshold relatively low, such as to favor false positives over false negatives (i.e. higher recall at the cost of lower precision).

Referring now to FIG. 8, a graphical interface referred to herein as "TilePicker" may be utilized (for example, as a curation interface 1303 as described above, referring to FIG. 13) to quickly identify the true positives from among all the detections. The true positives 810*a-n* are used to augment the positive training data, while the false positives 820*a-n* augment the negative samples. Similarly, alternate graphical software interfaces may be utilized to assist a user in selecting objects that were missed in the validation image. The regions around a "miss" may then be used to augment the positive training samples.

Bootstrapping can be an iterative process. In the data sets described herein, it was found that one or two rounds of bootstrapping on the validation image was sufficient to generate an accurate model, however additional bootstrapping operations may be necessary according to a particular use case. According to a preferred embodiment, precision-recall curves may be used on the validation image through the training stages (initial detection, bootstrapping round 1, and bootstrapping round 2), to judge when the model is sufficiently accurate. Then the final model created through this bootstrapping process may be used to perform detections on the withheld test image.

The McChord AFB data utilized consisted of fifteen images of an airplane runway area taken over a series of months. Another six images were from a different part of the base where helicopters are present.

The 15-image subset was used to train detectors for airplanes, parking lots, and storage tanks. 13 of the 15 images were used to generate positive and negative training samples. The 14th of 15 images was used for bootstrapping our models. The final image was withheld for testing the model. The same procedure was followed for helicopters using the 6-image subset. Four images were used to generate training samples, one was used for bootstrapping the model, and the final withheld for testing.

Each of the images was labeled by hand to establish ground truth. For parking lots, users outlined each parking area, creating a set of ground-truth polygons. For the other classes, users selected the center points of the objects. Parking lots and storage tanks are static facilities, so a single ground truth data file sufficed for all images. For airplanes and helicopters, each image had to be annotated separately.

Positive training samples were generated by extracting a rectangular patch around the center points of each object. For parking lots, a random representative point was selected from within each polygon for use as the center of the training patch. The size of the training patch varied based on the class. For airplanes, a size of 150×150 pixels was used, for parking lots and storage tanks 75×75 pixels, and for helicopters 50×50 pixels. To augment the positive training samples they were each rotated through 8 directions, in 45° increments.

Negative training samples were generated for each class by randomly selecting 200 patches from each training image and then discarding any of the patches that happen to contain part of the positive class.

TABLE 1

Summary of training data for McChord AFB. Each entry provides the number of positive/number of negative training samples, in total, at each stage.

| Class | Initial | Bootstrap1 | Bootstrap2 |
|---|---|---|---|
| Parking Lots | 12584/2322 | 14235/3561 | — |
| Storage Tanks | 1768/2587 | 1801/2637 | 1852/2792 |
| Airplanes | 1560/2578 | 1626/2662 | — |
| Helicopters | 1176/2193 | 1237/4979 | 1320/5112 |

Detections are processed using a sliding window of the given patch size (150×150 for planes, e.g.) with an overlap between windows of ⅓ the window width. The detection score for each sliding window is compared to a threshold to determine if the object of interest is present or not within the window region. The objects were not further segmented, thus multiple sliding windows can be considered true-positives for a single large object.

Detection results are shown in FIG. 9. These are the results on the respective test images for all classes using the final bootstrapped detectors. As illustrated, a number of aircraft 901 have been identified, as well as an airstrip 902. An unexpected result 903 was identified for the storage tank class. The detector discovered a storage tank that was not labeled as such in ground-truth annotations. In this case, it was a white storage tank sitting atop a white-roofed building, and thus was hard to see by the human eye (shown in the inset of the left image in the figure).

Precision-recall curves for each class are shown in FIG. 10. Each graph shows the precision-recall for each training stage (solid lines 1010a-b, 1020a-c, 1030a-c, 1040a-b) as well as the curve for the test image (dashed lines 1011, 1021, 1031, 1041). Here it can be seen how the bootstrapping process significantly improves the accuracy on 3 of the 4 classes.

The Corpus Christi data consisted of nine images of an oil-refining region near the coast of Corpus Christi, Tex. There are hundreds of oil storage tanks, of a variety of shapes, colors, and sizes in this imagery. Two of the nine Corpus Christi images were selected to use for model validation and bootstrapping, and the remaining seven images were used for testing.

This data set was used to evaluate the generation of an initial detector from globally distributed training samples, followed by bootstrapping to fine tune the model to perform well on the local images. An initial detector was trained using 3,165 samples created by providing the locations of storage tanks from the vicinities of 200 metropolitan areas around the world. This data was further augmented by employing known locations of 1,954 oil storage facilities near Cushing, Okla., for a total of 5,119 training samples. Negative samples were created from a clutter class derived by avoiding known storage tank locations, but in the same general vicinities as the positive samples, resulting in 9,651 negative samples.

FIG. 11 shows the detection results of a variant bootstrapping process used with the Corpus Christi exemplary data set. The details of bootstrapping the detector according to the present embodiment differ in one step from what was described previously (referring to FIGS. 7-10). An initial model was utilized to detect oil tanks (indicated as white bounding boxes 1110a-n) in the first 1101 of the two validation images. A TilePicker software interface (as described previously, referring to FIG. 8) was used to manually identify the true positives. Where the embodiment differs from the previous bootstrapping process is that after the first round of curation, a subsequent model was trained only on the new samples (427 positive, 921 negative). This was done to encourage quicker convergence on an optimized local model, since the relative fraction of local training samples to global is small. After this step, operation iterated the next two rounds of bootstrapping on the second validation image 1102 and third image 1103, following the same procedure that was done for the McChord AFB data. In this manner it can be appreciated that the specific nature and operational details of a particular bootstrapping process may vary according to the embodiment disclosed herein, and the operations, iterations, data types, or numerical values described are merely exemplary.

It may be appreciated that the results shown are qualitatively similar in accuracy to those of the McChord data set (referring to FIG. 10), where only local training samples were employed. It may be further appreciated that the results of the initial model, trained on thousands of diverse samples, generates good results—good enough that there is value in bootstrapping off this global model instead of simply starting from scratch.

As a second test employing a globally trained model, the detection of parking lots was performed as illustrated in FIG. 12. In this case, unlike the parking lot model for McChord AFB, OSM training data was used to create an initial model, followed by bootstrapping on imagery surrounding Tacoma, Wash., and finally testing was performed using a third set of imagery from Denver, Colo.

Two images were collected from the Denver downtown area and ground-truth was collected using crowdsourcing. The training data from the OSM database was then used with the positive class as parking lots and all the other classes, including a clutter class, as negative examples. This learned classifier was tested on a strip from Tacoma. The results were curated from the Tacoma strip and appended both the positive and negative curated examples of parking lots from the Tacoma area to the original training set to relearn the classifier. Another similar round of active learning was performed for one of the strips from the Denver area.

The retrained classifiers were tested on the Denver area test-strip. The results for the test strip using the original and the actively learned classifiers are shown in FIG. 12. The four precision-recall curves in the figure are described as follows. The curve labeled "uncurated" 1201 is for the case using when training data directly obtained from the OSM labels. The curve labeled "curated" 1202 is one obtained using OSM training data where additional curation was performed to reduce label noise (examples of OSM label noise are shown in FIG. 6). The final two curves, "al1" 1203 and "al2" 1204 are for the two rounds of active learning (aka bootstrapping) modifying the classifier learned from the curated OSM data.

It may be appreciated that the results achieved using the un-curated data may be better than the curated ones. This may be because some of the mislabels in the training data actually help improve the generalizability of the learned classifier. Another possibility as to why curation did not help was the ambiguity from many of the samples showing just a part of a parking lot amidst a set of buildings or other urban structures. It is also possible that in trying to make the data as clean as possible, important boundary cases may have been mistakenly discarded in the initial OSM curation.

It should also be appreciated that the test data in Denver is significantly different from the validation/bootstrapping data from McChord AFB, as opposed to previous examples where the test images are from the same AOI as the validation.

The above-described embodiments including the preferred embodiment and the best mode of the invention known to the inventor at the time of filing are given by illustrative examples only. The skilled person will be aware of a range of possible modifications of the various embodiments described above. Accordingly, the present invention is defined by the claims and their equivalents.

Changes and modifications may be made to the disclosed embodiments without departing from the scope of the present disclosure. These and other changes or modifications are intended to be included within the scope of the present disclosure, as expressed in the following claims.

What is claimed is:

1. A system for performing global scale object detection using satellite imagery, comprising:
    an object detection server comprising at least a plurality of programming instructions stored in a memory and operating on a processor of a network-connected computing device, the plurality of programming instructions adapted for performing global scale object detection:
    wherein the object detection server:
        (a) receives, at the object detection server, at least a plurality of image information from an image database;
        (b) analyzes, at the object detection server, at least a portion of the image information to produce analysis results, the analysis comprising:
            (i) extracting a plurality of scale-invariant transform descriptors based at least in part on the at least a portion of the plurality of image information;
            (ii) performing k-means clustering on the at least a portion of the plurality of image information;
            (iii) producing a plurality of locally-constrained linear codes based at least in part on the at least a portion of the plurality of image information; and
            (iv) encoding at least a portion of the plurality of scale-invariant transform descriptors by employing distance-based soft-assignments for the plurality of scale-invariant transform descriptors with the plurality of locally-constrained linear codes;
        (c) produces, at the object detection server, at least a plurality of object vector representations based at least in part on at least a portion of the analysis results; and
    a curation interface comprising at least another plurality of programming instructions stored in another memory and operating on another processor of another computing device and coupled to the object detection server:
    wherein the curation interface:
        (d) receives, at the curation interface, at least a portion of a plurality of image information;
        (e) receives, at the curation interface, interaction from a human user device; and
        (f) modifies, at the curation interface, at least a portion of the plurality of image information based at least in part on at least a portion of the user interaction.

2. The system of claim 1, wherein the another plurality of programming instructions when executed by the processor causes the processor to:
    receive at least a plurality of object vector representations, and
    modify at least a portion of the object vector representations based at least in part on at least a portion of the user interaction.

3. A method for performing global scale object detection using satellite imagery, the method comprising:
    an object detection server comprising at least a plurality of programming instructions stored in a memory and operating on a processor of a network-connected computing device, the plurality of programming instructions adapted for performing global scale object detection, the plurality of programming instructions adapted to perform global scale object detection using satellite imagery comprising the steps of:
        (a) receiving, at the object detection server, at least a plurality of image information from an image database:
        (b) analyzing, at the object detection server, at least a portion of the image information to produce analysis results, the analysis comprising:
            (i) extracting a plurality of scale-invariant transform descriptors based at least in part on the at least a portion of the plurality of image information;
            (ii) performing k-means clustering on the at least a portion of the plurality of image information;
            (iii) producing a plurality of locally-constrained linear codes based at least in part on the at least a portion of the plurality of image information; and
            (iv) encoding at least a portion of the plurality of scale-invariant transform descriptors by employing distance-based soft-assignments for the plurality of scale-invariant transform descriptors with the plurality of locally-constrained linear codes;

(c) producing, at the object detection server, at least a plurality of object vector representations based at least in part on at least a portion of the analysis results; and a curation interface comprising at least another plurality of programming instructions stored in another memory and operating on another processor of another computing device and coupled to the object detection server, the another plurality of programming instructions adapted to curate satellite imagery, the curation comprising the steps of:

(d) receiving, at the curation interface, at least a portion of a plurality of image information;

(e) receiving, at the curation interface, interaction from a user device; and (f) modifying, at the curation interface, at least a portion of the plurality of image information based at least in part on at least a portion of the interaction.

* * * * *